United States Patent [19]

Dahlquist et al.

[11] Patent Number: 5,062,002
[45] Date of Patent: Oct. 29, 1991

[54] ELECTROSTATIC PRINTER WITH COLOR HUE OR GREY LEVEL CONTROLLED BY THE LEVEL AND/OR DUTY CYCLE OF VOLTAGES APPLIED TO EACH STYLI

[75] Inventors: Brian J. Dahlquist, Palo Alto; David E. Doggett, Los Gatos; Gordon S. Mitchard, Monte Sereno, all of Calif.

[73] Assignee: Synergy Computer Graphics Corporation, Sunnyvale, Calif.

[21] Appl. No.: 345,327

[22] Filed: Apr. 28, 1989

[51] Int. Cl.$^5$ .......................... G01D 15/06; B41J 2/40; B41J 2/41
[52] U.S. Cl. .................................... 358/298; 346/155; 346/157
[58] Field of Search .............................. 358/298, 300; 346/153.1, 155, 157

[56] References Cited

U.S. PATENT DOCUMENTS

| | | |
|---|---|---|
| 3,757,036 | 9/1973 | Libbet et al. . |
| 4,415,913 | 11/1983 | Diddens .................. 358/298 |
| 4,415,914 | 11/1983 | Giordano ................ 358/298 |
| 4,456,392 | 6/1984 | Nozaki .................... 400/120 |
| 4,485,982 | 12/1984 | St. John et al. ........ 346/157 |
| 4,521,790 | 6/1985 | Allard ...................... 346/155 |
| 4,562,443 | 12/1985 | Matsuno ............... 346/76 PH |
| 4,569,584 | 2/1986 | St. John et al. . |
| 4,623,902 | 11/1986 | Yamanishi ........... 346/76 PH |
| 4,642,656 | 2/1987 | Shibuya ............... 346/76 PH |
| 4,661,826 | 4/1987 | Saitou .................. 346/76 PH |
| 4,672,400 | 6/1987 | Dogget .................... 346/155 |
| 4,717,270 | 1/1988 | Tsutsumi ............. 346/76 PH |
| 4,731,542 | 3/1988 | Dogget . |

FOREIGN PATENT DOCUMENTS

201686 11/1983 Japan .

Primary Examiner—Benjamin R. Fuller
Assistant Examiner—Scott A. Rogers
Attorney, Agent, or Firm—Skjerven, Morrill, MacPherson, Franklin & Friel

[57] ABSTRACT

A plurality of hues of color or shades of grey are obtained on a print medium using an electrostatic printer by varying either or both the voltage applied to each styli in the print head and the time of application of such voltage.

15 Claims, 8 Drawing Sheets

CIRCUIT A
(22-p Figure 2)
FIGURE 4A

ELECTROSTATIC PRINTER WITH COLOR HUE OR GREY LEVEL CONTROLLED BY THE LEVEL AND/OR DUTY CYCLE OF VOLTAGES APPLIED TO EACH STYLI

FIELD OF THE INVENTION

This invention relates to electrostatic plotters and in particular to a structure and method for creating a plurality of levels of grey or degrees of coloration at single pixel locations on a print medium.

PRIOR ART

Known color electrostatic plotters create color by using a plurality of toning stations each of which applies a selected color toner to a dielectric print medium that has previously had formed thereon a latent electrostatic image. Colored toners make visible and appropriately color the latent electrostatic image. Cost dictates that the number of toning stations be minimized and color perception theory dictates that the minimum number of toning stations (herein sometimes called coloration stations) necessary to produce an acceptable range of colors is three, where the colors used are the subtractive primary colors, i.e., magenta, cyan and yellow. As a practical matter, a fourth "color", black, is usually used because the human visual system is especially sensitive to the quality of black and black obtained by combining commercially available magenta, cyan and yellow is of particularly poor quality.

When a plotter is used in this fashion, the print medium is printed with each primary color in a sequential fashion where each pixel location on the medium will have either no coloration (i.e., white), or all three subtractive primary colors (i.e., black), or will have some combination of the subtractive primary colors, magenta, cyan or yellow. Because colors printed with a prior art electrostatic printer are printed in a fashion such that a particular primary color is either present or absent at a given pixel location, the range of colors available at a standard single pixel location consists of eight colors: white, black, magenta, cyan, yellow, red, green and blue. This technique is called simple "Digital Printing" and is well known in the art. The latter three colors are a combination of any two of the three subtractive primary colors.

When a wider range of color hue is desired (i.e., more than eight colors) these colors can be obtained through use of a "super pixel", i.e., a combination of two or more adjacent standard pixels, each standard pixel having a color selected such that the combination of colors in the super pixel gives to the viewer a wider range of perceived colors depending upon the particular mix of subtractive primary colors in the super pixel. Within the super pixel each standard pixel has color printed as described above. Theoretically, through use of the super pixel, a printer can create all colors and hues from a combination of magenta, cyan and yellow. Use of a super pixel is called "digital half-toning" and is well known in the art.

In black and white printing, the effect of digital half-toning is to produce levels of grey at a super pixel location. In color printing the term "grey level" is also used and denotes either a change in saturation of a primary color at a pixel location or a change in area coverage of a saturated primary color at a pixel or super pixel location.

Techniques for printing colors on an electrostatic print medium are well-known and are described, for example, in U.S. Pat. No. 4,672,400 and 4,731,542 issued on applications of David E. Doggett, assigned to Synergy Computer Graphics, the assignee of this application. Disclosure of these two patents are hereby incorporated by reference. St. John et al. in U.S. Pat. No. 4,485,982 and 4,569,584 disclose other techniques for forming color on electrostatic print media. All of the above techniques use "digital printing" where the saturated primary color is either present or not at a given pixel location on the print medium. The gamut of colors capable of being so printed in a standard pixel is limited to the specific primary colors provided by the toner stations or to those colors obtained by mixing these primary colors in the above-mentioned digital fashion Since with "digital printing" no gradation, at a single pixel location, in the amount of each color that is applied to the print medium by a toner station is possible, therefore a wide range of color hues is not possible unless a super pixel is used. However, use of a super pixel causes a loss in resolution. Therefore, because of the loss of resolution suffered when using a super pixel, grey level at the single pixel level is desirable so as to maintain resolution and still provide a wide range of coloration (i.e., a wide range of hues).

Allard, in U.S. Pat. No. 4,521,790 issued June 4, 1985 entitled "Electrostatic Printer Of Video Pictures With Grey Tones" discloses a method whereby single pixel grey level control is possible. Allard achieves this result by multiplexing styli in the print head, by using styli that have a rectangular cross-section, and by moving the print media past multiplexed styli such that a total multiplexing cycle is completed and all styli in the head are activated while the print medium moves a fraction of one pixel length past the styli. A number of multiplexing cycles are completed across the electrostatic print head during the time the print medium moves one pixel length past the styli. According to Allard, the number of multiplexing cycles completed during movement of the medium by one pixel length determines the number of different grey tones which can be achieved. Allard teaches that a single voltage driver per recording electrode can be used, but a less expensive technique uses multiplexing to allow a single voltage driver to be used with a plurality of styli. The trade-off, however, is a much slower movement of paper beneath the styli. Allard teaches one embodiment which has the capability of producing black, white and fourteen levels of grey ('790 patent, column 3, lines 44-52). Allard teaches that to obtain full benefit of his invention, the print medium (i.e., such as dielectric paper) must be advanced past the recording electrodes in microsteps (in one embodiment of approximately 23 microns per step corresponding to the 23 micron width of the styli in the embodiment mentioned in his disclosure). Allard acknowledges that his technique "effectively reduces the paper speed as compared to a standard electrostatic printer."

A review of Allard's specification discloses that Allard is working with a resolution of approximately seventy dots per inch. Multiplexing to reduce the number of drivers required to drive the styli increases the time required to print various tones of grey on the print medium, thereby slowing movement of the print medium past the head. In addition, if resolution of the printer were to be increased, the number of multiplexed groups of styli would increase and therefore time required to print a line would increase in proportion. This would further slow the printing process. In such a microstep printer, in order to obtain as high a print medium speed as possible, the print time of each multiplexed group of styli would need to be kept to a minimum. However, as print time is decreased additional requirements are placed on the print medium in order to minimize the effects of multiplex printing artifacts, such as ghosting, nib (i.e., stylus) group boundary striations and spurious writing. Such media sensitivity is undesirable.

The printing of single pixel grey levels as taught by Allard '790 does not scale well to high resolution printing where resolution of the printer is of the order of 400 dots per inch and thickness of the stylus is reduced, for example, to approximately 5 microns, as disclosed in a copending application entitled "Electrostatic Printer Head Structure and Styli Geometry" filed on the same day as this application and assigned to Synergy Computer Graphics Corporation, assignee of this application. If a high voltage is placed on such a stylus for an interval of time much less than that required to move the medium an appreciable fraction of stylus width, the charge image produced on the medium by the stylus will be larger than the exact geometric size of the stylus. This is called spot size growth. Operating under these conditions, a stylus loses the ability to produce many discrete charge images of its stylus shape and size and thereby loses the ability to produce many levels of grey at one pixel location because of the above-mentioned spot-size growth.

Use of a lower voltage on the stylus will result in less spot size growth and therefore will enable increased levels of grey to be achieved. However, at lower voltage, the toned image formed will have low optical density. This low optical density is especially apparent if large solid areas are printed.

While Allard discloses pixel level grey scale with a number of different levels of grey capable of being reproduced at one pixel location. the voltage at which Allard could achieve this result would have to be low to prevent spot size growth, if his invention were to be used at high resolution (i.e., 400 dots per inch). Such a low voltage would affect print quality so as to reduce optical density of the visual image. A higher voltage would increase density and improve consistency of the visual image but would also cause spot size growth and therefore reduce the number of levels of grey which could be achieved at a single pixel location.

SUMMARY OF THE INVENTION

This invention overcomes the problems of prior art by using both different voltage levels and different time intervals to create various levels of grey at a single pixel location with a single stylus.

In accordance with the present invention, a large number of grey areas can be produced at the pixel level and yet solid, dense images can also be produced of high quality. This is done by being able to vary both voltage level and time interval to achieve the desired image. Should a solid image be desired across most of the pixel, voltage on the stylus is maximized to provide a uniform, dense, crisp image. Spot size growth occurs, but is of little concern because the pixel image size desired is large. Should a smaller portion of the pixel be desired to be charged and subsequently toned, the voltage on the stylus is decreased so as to reduce spot size growth. While the resulting stylus image will be of lower density, it will also be substantially smaller in size than a higher voltage, higher density, stylus image, but because the desired pixel grey level is low, it will not cause a degradation of the perceived quality of the image at the lower voltage level. The time interval the stylus is energized can also be varied so as to produce variations in area coverage to effect an even wider change in grey level at a single pixel location as disclosed by Allard '790. Use of a plurality of voltage levels intermediate between the highest voltage used and the lowest voltage used together with a plurality of time intervals during which the stylus is energized will create a wide range of grey levels in a most efficient manner. In accordance with this invention, balance between voltage level and time interval the voltage level is applied to a stylus is governed by certain rules to ensure that desired grey scale images or range of color hues are obtainable without a significant degradation in image quality. These rules are dependent upon the particular stylus geometry, the print head resolution and other machine and media dependent factors and are therefore, empirical in nature.

This invention will be more fully understood in conjunction with the following drawings:

DETAILED DESCRIPTION

Figure 1A:
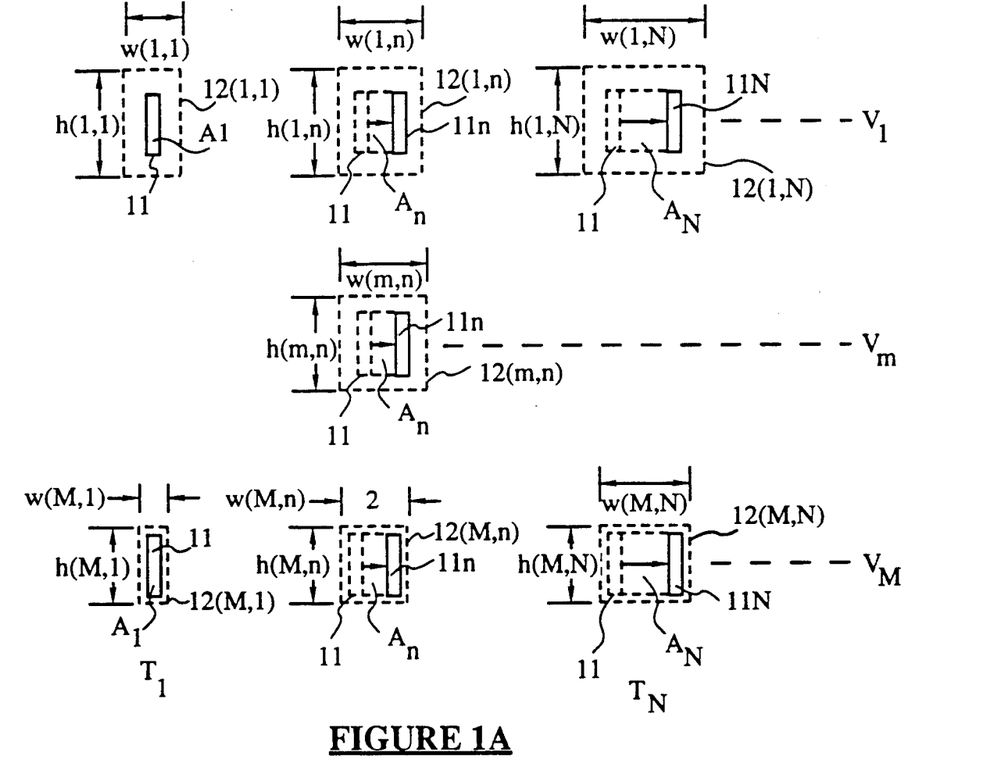
FIG. 1A illustrates schematically, differences in pixel image size as a function of variations in voltage applied to a stylus and variations in time of application of the voltage to the stylus.
Figure 1B:
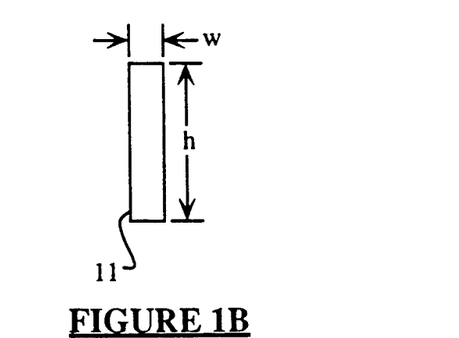
FIG. 1B illustrates schematically width "w" and height "h" of the rectangular cross-section of a stylus used in accordance with this invention.

FIG. 1A is a plot of various charge image sizes on toned print media obtainable in a single pixel as a function of application of different voltage levels for different time intervals to stylus 11 which is shown in cross-section in FIG. 1B. In an actual system stylus 11 remains stationary and the print medium moves to the left past stylus 11 but for convenience in FIG. 1A stylus 11 is shown in two different locations relative to the print medium to indicate motion of the print medium relative to stylus 11. In the upper left hand corner of FIG. 1A the toned image which is produced by a voltage $V_1$ applied for a time $T_1$, which is of a duration such that the print medium does not move a measurable amount during application of voltage $V_1$, has a size denoted by dashed line 12(1,1) which is much larger than cross sectional Area $A_1$ of stylus 11. Width w(1,1) and height h(1,1) of image 12(1,1) are much larger than corresponding dimensions of stylus 11 due to the phenomenon of spot size growth discussed above. Should, however, voltage $V_1$ be applied to stylus 11 for time TN, image 12(1,N) is obtained as shown in the upper right hand portion of FIG. 1A. Image 12(1,N) has a width w(1,N) and a height h(1,N). As shown in FIG. 1A, image 12(1,N) is much larger than area $A_N$ of the print medium covered by electrode 11 as the print medium traverses past electrode 11. This traverse is shown by showing electrode or stylus 11 twice, once as electrode 11 and once as electrode 11N. The relative positions of these two electrodes 11 and 11N represent the left and right limits of the area on the print medium covered by stylus 11 while voltage is applied to stylus 11 as the print medium moves past stylus 11. Again, the size of image 12(1,N) is enlarged over the area of the print medium swept past electrode 11 over time $T_N$ due to spot size growth.

In the middle of FIG. 1A is shown an image 12 (m,n) having a height h(m,n) and a width w(m,n) where spot 12(m,n) is still expanded over area $A_n$ but is not as large as area 12(1,n) due to a lower voltage $V_m$ on stylus 11 and a resultant lower spot-size growth. The stylus depicted with numeral 11 represents the location of the stylus relative to the print medium at the time voltage $V_m$ is first applied to stylus 11 and the stylus depicted with numeral 11n represents the location of the stylus relative to the print medium at the time $T_n$ when voltage $V_m$ applied to stylus 11 is terminated.

In the bottom left corner of FIG. 1A is shown stylus 11 producing charge image 12(M,1) having height h(M,1) approximately equal to the height of stylus 11 and width w(M,1) of just slightly thicker than the thickness of stylus 11 due to a lower amount of spot size growth during application of voltage $V_M$ to stylus 11 for time $T_1$. Voltage $V_M$ is less than voltage $V_m$ which in turn is less than voltage $V_1$. Time $T_1$ is smaller than time $T_n$, which in turn is smaller than time $T_N$. FIG. 1A illustrates schematically different times $T_1$, $T_n$ and $T_N$ for the application of each of different voltage levels $V_1$, $V_m$ and $V_M$ to stylus 11. Thus, there are a total of M×N possible combinations of voltage and time for application to electrode 11 to generate M×N different sizes of charge images at a standard pixel location. It should be recognized that if changes in voltage or time interval are too small, the difference in size of the charge image will be insignificant and will result in no perceived change in printed grey level.

Figure 2:
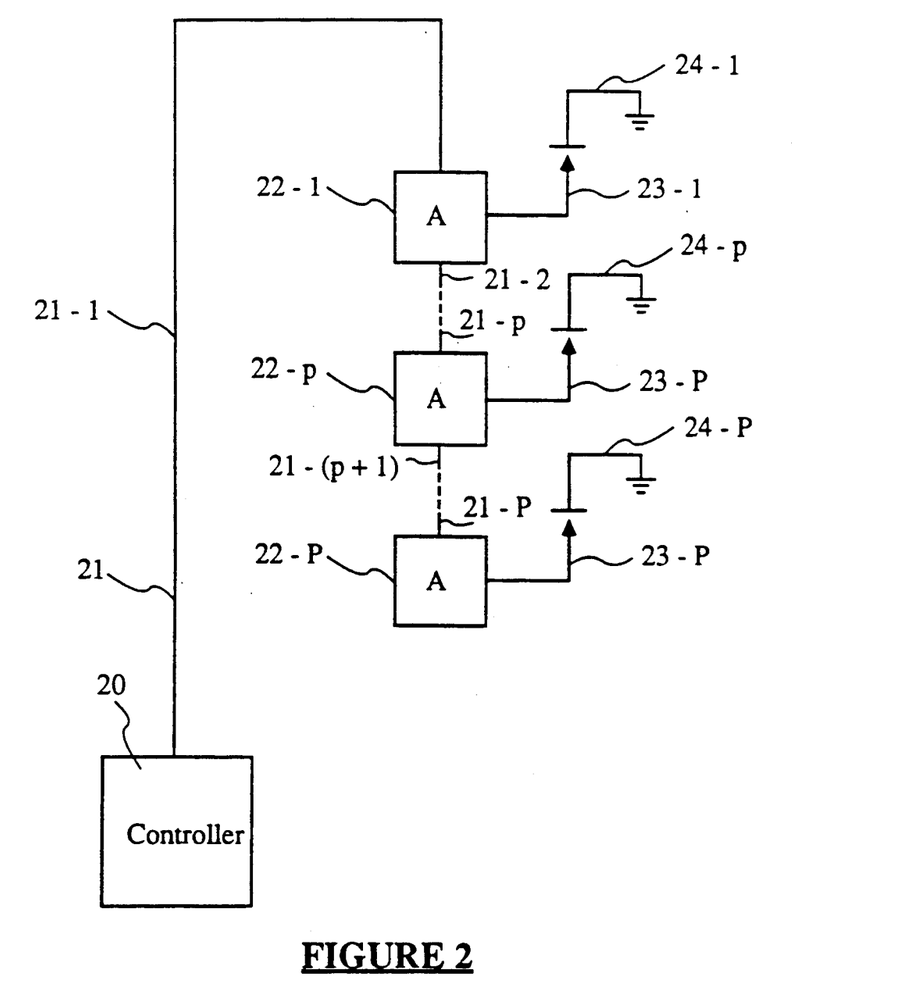
FIG. 2 illustrates in schematic block diagram form one embodiment of the structure used to control voltage applied to each stylus and the time of application of that voltage.

FIG. 2 illustrates in schematic block diagram form the general structure for applying voltage as a function of time to styli in an electrostatic print head. As shown in FIG. 2, controller 20 is connected by bus 21-1 to control circuit 22-1. Control circuit 22-1 is one of P control circuits (22-1 through 22-P) where P is a selected integer equal to the number of styli 23 in the electrostatic print head. Control circuit 22-1 is connected by bus 21-2 to control circuit 22-2 (not shown).

Control circuit 22-(p-1) (not shown) is connected by bus 21-p to control circuit 22-p, where p is an identifying integer given by $1 \leq p \leq P$. Control circuit 22-p is connected by bus 21-(p+1) to control circuit 22-(p+1) (not shown) and ultimately control circuit 22-(P−1) (not shown) is connected by bus 21-P to control circuit 22-P.

Bus 21-1 carries signals necessary to select the particular voltage ($V_1$ through $V_M$) to be applied to each styli as well as signals necessary to select the particular time ($T_1$ through $T_N$) during which this voltage is to be applied. In one embodiment, M=4 and N=4, four different voltages are capable of being applied to each styli. These four voltages are each capable of being applied for up to four different times. This allows M×N or 16 different combinations of charge image size to be formed in a standard pixel. It is not necessary to have M=N and further, it is not necessary that all possible combinations within a given M×N matrix be used, as it may be that not all pixel images generated by voltage, time combinations will be unique and fully differentiated from the all other pixel images generated by their respective voltage, time combinations. Thusly, it may be that of the matrix M×N=T combination only R selection will be useful (where R<T). Therefore, in the case where M=4, N=4 and T=16, the selection process may only select R=10 levels as being clearly differentiated and forming a reasonably linear progression of grey levels that conform to the desired image density.

In the structure of FIG. 2, each stylus 23-1 through 23-P is controlled by a corresponding control circuit 22-1 through 22-P. Each stylus is opposite a corresponding one of backplates 24-1 through 24-P. In the preferred embodiment, the backplate 24 consists of a single conductive backplate that is at some voltage level, usually ground potential. In operation, controller 20 selects from a memory, in a well-known manner, particular bits which are to control one cycle of the operation of each stylus 23-1 through 23-P. The number of bits required to control one stylus is the number of bits (q) required to represent M states of voltage plus the number of bits (r) required to represent N states of time. These bits are then transmitted in a serial manner, from controller 20, in groups of q plus r bits with the first set of q bits in each group controlling the voltage to be applied to a particular stylus and the second set of r bits in each group controlling the time during which this voltage is applied to the corresponding stylus. Such an arrangement of data bits is arbitrary and any other useful arrangement of data bits can be substituted. A 36 inch electrostatic print head with 400 dots per inch resolution will have 14,400 styli (i.e. P equals 14,400). Accordingly if M=4 and N=4, two binary bits will be required to represent M (i.e., q=2) and two to represent N (i.e., r=2) in the serial transfer of data to each of stylus control circuits 22-1 to 22-P. Therefore, 57,600 bits are required to be transmitted serially from controller 20 to control circuits 22-1 through 22-P to control one cycle of printing using styli 23-1 through 23-P. The bits from controller 20 are transmitted serially onto bus 21-1 first to circuit 22-1 and then through a shift register contained in circuit 22-1 (to be described below in conjunction with FIG. 4A) to the next circuit 22-2 (not shown) over bus 21-2 which is in line serially, until the first group of q+r bits shifts through P-1 control circuits and reaches control circuit 22-P, where P=14,400. If 14,400 groups of four bits are transmitted at a rate of 10 megahertz, then 5.76 milliseconds are required to load the P control circuits 22-1 through 22-P. When data transfer for one print cycle (i.e., for one line on the print medium) is complete, the set of q +r bits in each control circuit 22-1 through 22-P is transferred simultaneously to a set of latches in each control circuit (also to be described below in conjunction with FIG. 4A) and printing of that line will commence. Printing continues while data (57,600 bits) for the next print cycle is again transmitted over serial line 21 to control circuits 22-1 to 22-P.

Figure 4A:
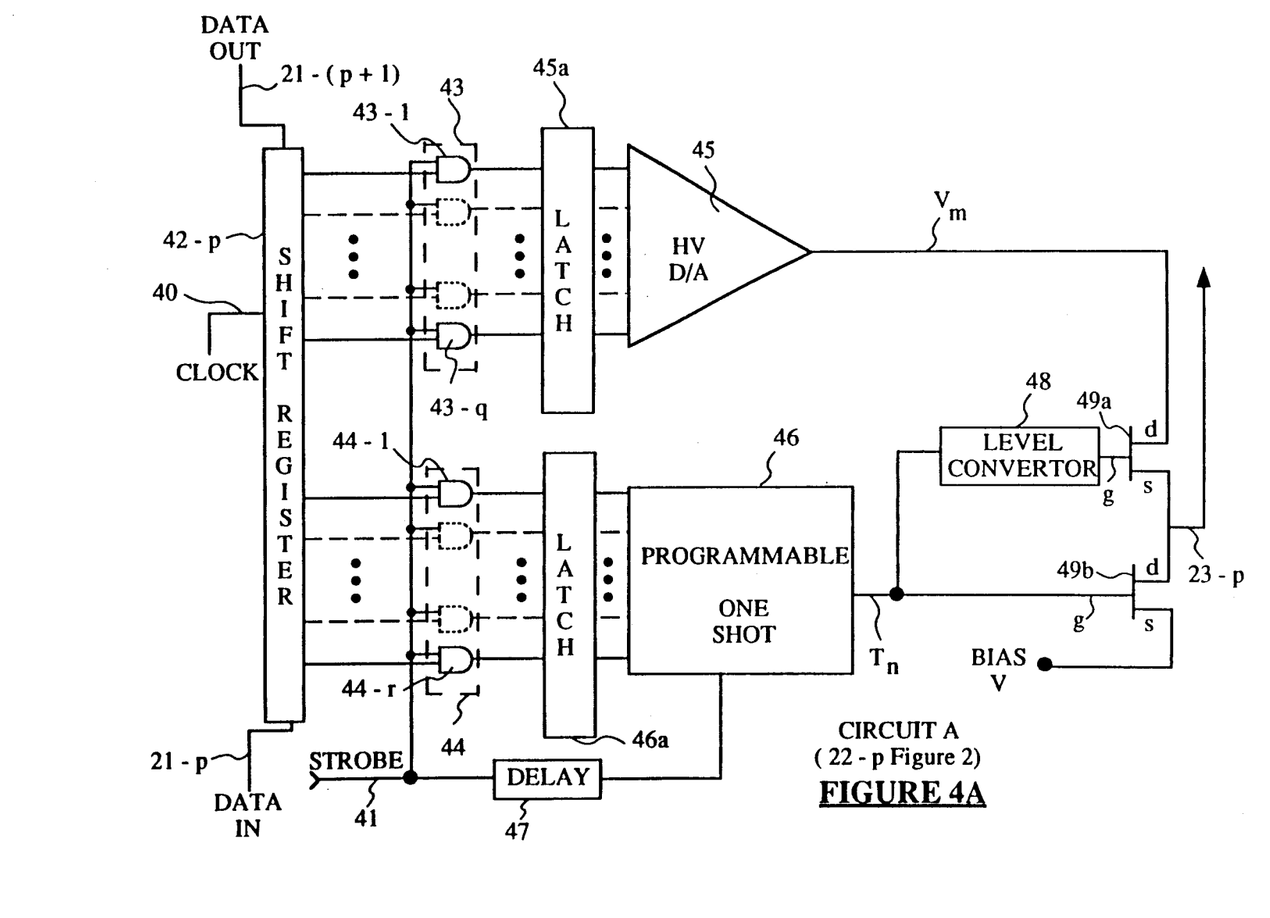
FIG. 4A illustrates in more detail the structure of circuits 22-1 through 22-N shown in FIG. 2.

As shown in FIG. 4A, which depicts circuitry in each of control circuits 22-p in more detail, bits transmitted from controller 20 to control each of circuits 22-1 through 22-P are first placed in shift register 42-p. When p=1, shift register 42-1 is located in control circuit 22-1 shown in FIG. 2. For control circuit 22-p the bits are transmitted into shift register 42-p on bus 21-p and through shift register 42-p to the next shift register 42-(p+1) on bus 21-(p+1) (see FIG. 2). Thus, bits are first transmitted in series through shift register 42-1 and then through subsequent shift registers until each group of (q+r) bits reaches the particular shift register 42-p in which it is to be located to control both voltage $V_m$ to be applied to the corresponding stylus 23-p (FIG. 2) and time interval $T_n$ during which this voltage is to be applied to stylus 23-p. As shown in FIG. 4A, this control is obtained, in one embodiment, by latching data contained in shift register 42-p in response to a strobe signal on lead 41 into latching circuits 45a and 46a of well-known design connected to high voltage digital to analog (D/A) converter 45 and to programmable one-shot (OS) multivibrator 46, respectively. Latching takes place through application of the strobe signal on strobe lead 41 to one input lead of each of AND gates 43-1 through 43-q connected to the input leads of latch 45a so that latch 45a will then contain a portion of the data that was in shift register 42-p to control the operation of D/A converter 45. Simultaneously, the strobe signal on lead 41 is applied to one input lead of each of AND gates 44-1 through 44-r connected to the input leads of latch 45a so that latch 45a will then contain a portion of the data that was in shift register 42-p to control the time interval during which programmable OS multivibrator 46 allows voltage to be applied to corresponding stylus 23-p.

Following the latching of data into latches 45a and 46a, data for the next cycle of operation of the print head is shifted into shift registers 42-1 through 42-P while simultaneously the styli 23-1 through 23-P are being controlled to deposit charges on the print medium by signals previously placed in latches 45a and 46a in each of circuits 22-1 through 22-P.

Bits stored in latch 45a select a voltage $V_m$ for application to drain "d" of MOS transistor 49a. Simultaneously, bits stored in latch 46a control the time interval during which programmable one-shot multivibrator 46 will be turned on by a trigger signal from time delay 47 to thereby apply a voltage to gate "g" of MOS transistor 49b and through level converter 48 to gate "g" of MOS transistor 49a, the two transistors connected in series to function as a voltage divider to apply voltage $V_m$ to stylus 23-p for time interval $T_n$. When programmable one-shot multivibrator 46 is triggered, an output signal is provided to the gate "g" of MOS transistor 49b and through level converter 48 to the gate "g" of MOS transistor 49a. Voltage applied to the gate of transistor 49a is sufficient to allow transistor 49a to conduct to thereby cause the voltage on stylus 23-p to rise to approximately the level of the output voltage from D/A converter 45. Transistor 49b is simultaneously turned off so as to function as a high impedance to limit current drawn through transistor 49a to a small value. This condition will exist during the time that the output of programmable OS multivibrator 46 is high. Accordingly, stylus 23-p is charged to selected voltage $V_m$ corresponding to the output voltage from D/A converter 45 for selected time interval $T_n$ controlled by the output signal from programmable OS multivibrator 46. Stylus 23-p thereby causes a selected charge image to form on the print medium adjacent stylus 23-p according to rules indicated by patterns shown in FIG. 1A. The actual charge image pattern is determined by voltage $V_m$ applied to stylus 23-p for time $T_n$. Note that m is a counting integer given by $1 \leq m \leq M$ and n is a counting integer given by $1 \leq n \leq N$. Integers m and n are related to voltage or time interval steps required to effect changes in grey level at the single pixel level.

Figure 3:
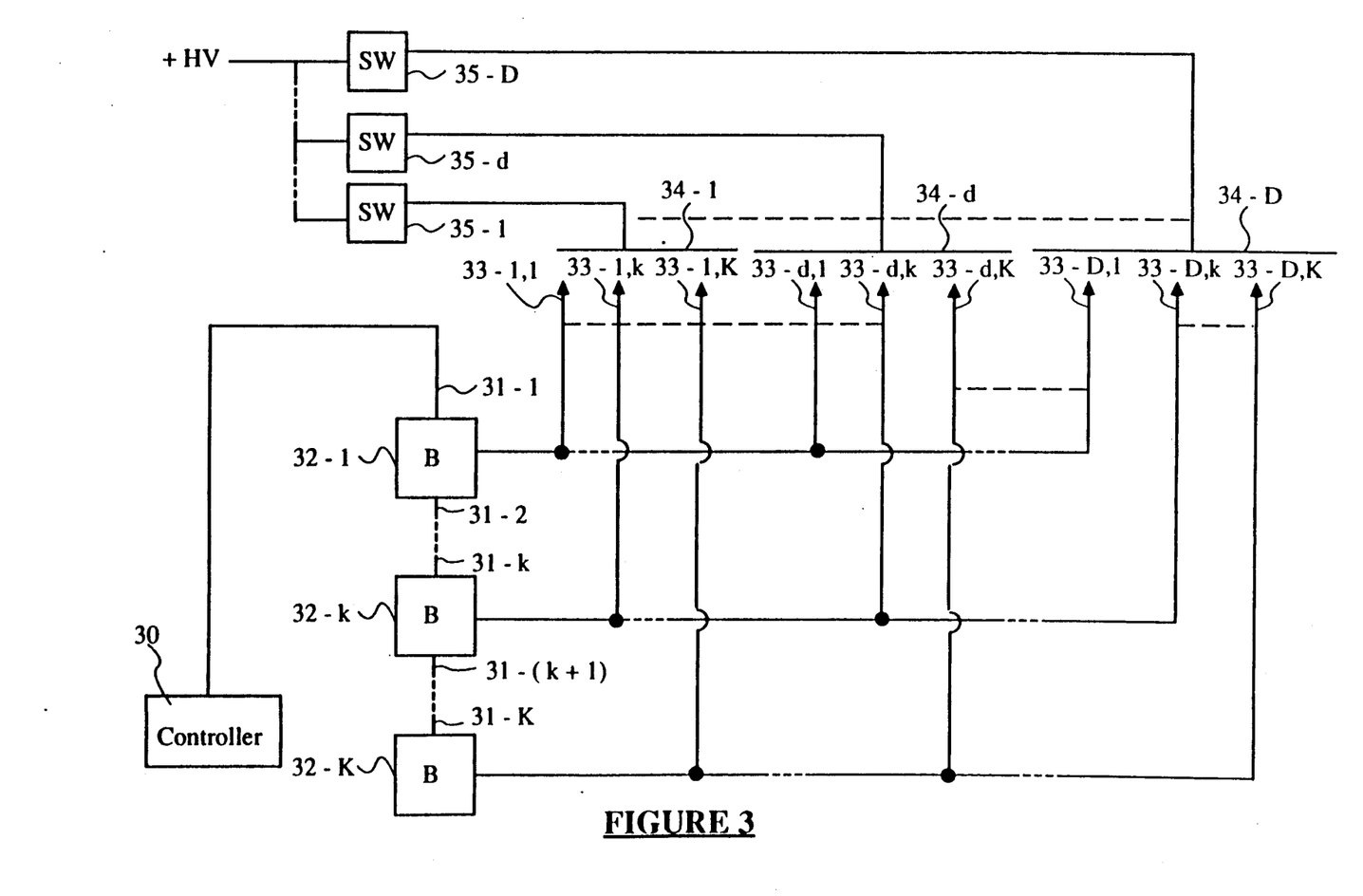
FIG. 3 illustrates a second embodiment of this invention wherein principles of this invention are applied to a multiplexed electrostatic print head.

FIG. 3 shows in schematic block diagram form a structure wherein the voltages applied to selected styli 33-1,1 to 33-D,K are multiplexed in D groups of K styli per group by use of backplates 34-1 through 34-D. As shown in FIG. 3, each drive circuit 32-1 through 32-K drives D corresponding styli, where K and D are selected integers related by the equation $D \times K = P$ where P is the total number of styli to be multiplexed. Thus, the styli 33 are divided into D groups of K styli per group where the $k^{th}$ styli of each group is electrically connected to the $k^{th}$ styli of every other group to form a set of D styli all connected together. Each set of D styli is driven by a corresponding one of control circuits 32-1 through 32-K. The first group of K styli 33-1,1 through 33-1,K is adjacent to field plate 34-1 (also called a backplate). Charge is deposited on the print medium adjacent these K styli by applying voltage (typically +275V) through switching circuit 35-1 to backplate 34-1 while maintaining all other backplates (backplate 34-2 (not shown) which is adjacent to styli 33-2,1 through 33-2,K, to backplate 34-D which is adjacent to styli 33-D,1 through 33-D,K) at nominally zero volts. Accordingly, charge is deposited or not deposited on the medium adjacent each of styli 33-1,1 through 33-D,K in an amount controlled by voltage applied to the corresponding stylus by individual control circuits 32-1 through 32-K and voltage on the corresponding backplate 34-d (where d is an integer given by $1 \leq d \leq D$). The multiplexing of styli 33 means that D cycles are required to deposit charge on the print medium adjacent the D groups of K styli. Accordingly, controller 30 takes D cycles of loading the shift registers associated with control circuits 32-1 through 32-K with their appropriate groups of bits to print one line of P pixels. However, cost is reduced by using (P/D)+K control circuits 22 shown in the embodiment of FIG. 2.

Figure 4B:
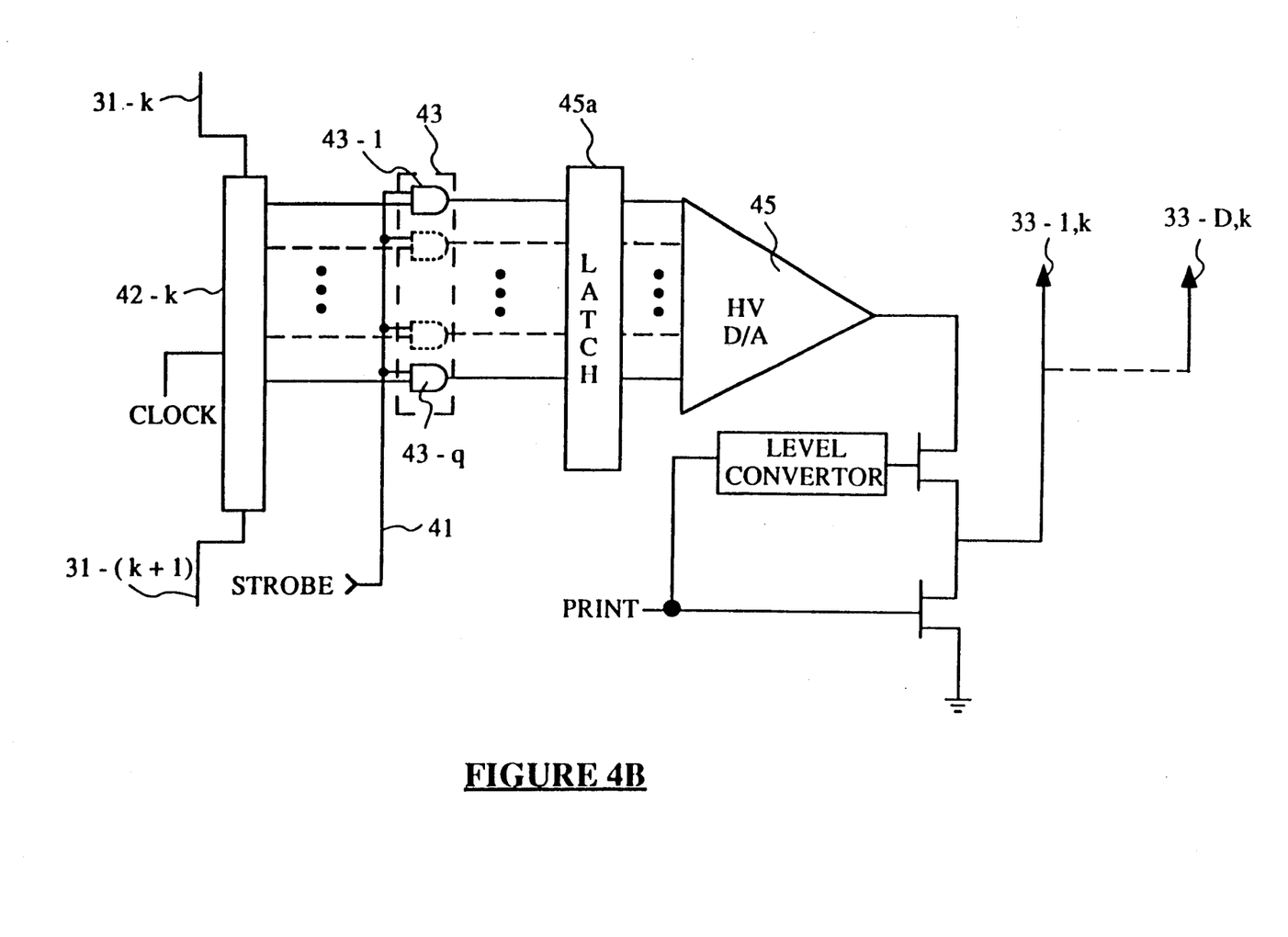
FIG. 4B illustrates in more detail the structure of circuits 32-1 through 32-K shown in FIG. 3.

Circuit B, depicted in FIG. 3 by blocks 32-1 through 32-K, is shown in more detail in FIG. 4B. The circuit in FIG. 4B is identical to, and operates in the same way as the circuit in FIG. 4A except that the circuit of FIG. 4B omits programmable one-shot 46 of FIG. 4A. This reflects the fact that during multiplexed operation of the circuitry of FIG. 3, the print medium is effectively stationary relative to styli 33-1,1 through 33-D,K and thus any variation in the time (beyond a certain minimum time) of application of voltage to a stylus will have little or no effect on the charge area 12 (m,l) disclosed in FIG. 1A.

In operation, q bits of data are switched serially on bus 31-1 (FIGS. 3 and 4B) from controller 30 into first control circuit 32-1. In total, K sets of q bits each are switched serially on bus 31-1 into circuit 32-1 and from circuit 32-1 serially through each of circuits 32-k (where k in FIG. 3 is an integer given by $1 \leq k \leq K$) until the first set of q bits reaches shift register 42-K (see FIG. 4B) which is a part of control circuit 32-K. Thus, as shown in FIG. 4B, in general, bits on bus 31-k enter shift register 42-k in response to a clock signal and exit shift register 42-k in transit to the next shift register 42-(k+1) on output serial bus 31-(k+1). When the first group of q bits reaches shift register 42-K associated with control circuit 32-K (FIG. 3), the strobe signal 41 latches the bits in each shift register (42-1 through 42-K) through the corresponding AND gates 43-1 through 43-q into the corresponding latch 45a. Each of the K individual high voltage D/A converters 45 then produces an output voltage which is applied simultaneously to styli 33-1,k through 33-D,k. Note that a typical multiplexed electrostatic print system uses D backplates and K driver circuits such that $D \times K = P$ (where $P = 14,400$ for a 400 dot per inch, 36 inch head). A significant reduction in cost is thus achieved by reducing the number of driver circuits to $(P/D) + K$ drivers, but at the price of a slow down in the movement of the print medium past the styli by a factor of 1/D. The time the styli is turned on is short with respect to the movement of the media past the styli. The drawing out of the printed pixel is accomplished after Allard '790 by moving the media a fraction of a pixel length for each print cycle. The pixel is built up by applying repeated print cycles. In this manner the time element is incorporated in the density of the final pixel.

Figure 5:
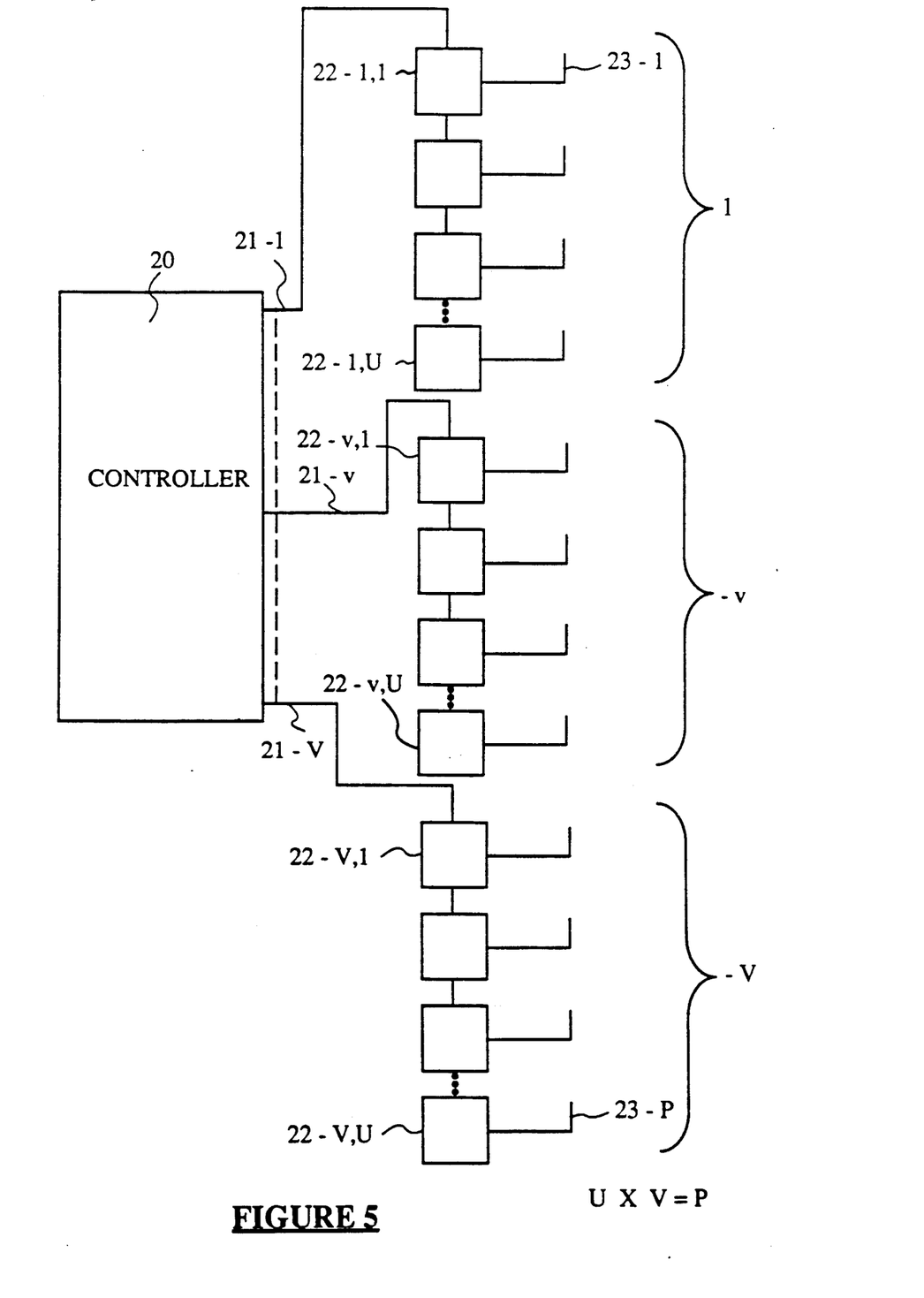
FIG. 5 illustrates in schematic block diagram form an embodiment of this invention wherein V sets of U styli each are activated in parallel and data is read serially into each of the stylus control circuits 22-v, u in the vth set of styli and simultaneously into each of the V sets of styli.

FIG. 5 illustrates in schematic block diagram form an embodiment of this invention wherein V sets of U styli each are activated in parallel and data is read serially into each of the U styli in each set of styli and simultaneously into each of the V sets of styli. As shown in FIG. 5, controller 20 supplies the data bits used to control the gray scale to be printed by each of the styli 23-1 through 23-P. For discussion purposes, the general stylus 22-v,u will be described with it being understood that v is an integer defined by $1 \leq v \leq V$ and u is an integer defined by $1 \leq u \leq U$, where V represents the numbers of sets of styli and U represents the number of styli in each set. The number of styli P is represented by the product U.V. The data bits are loaded simultaneously into each set v of styli from controller 20 on leads 21-1 through 21-V. Lead 21-1 provides data serially to the styli control circuits 22-1,1 through 22-1,u. Leads 21-v and 21-V provides data in serial to styli control circuits 22-v,1 through 22-v,U and to styli control circuits 22-V,1 through 22-V,U, respectively. The data is transmitted in series simultaneously on each of leads 21-1 through 21-V to each of the V sets of styli. A reduction in the time necessary to load data into the styli control circuits 22-1,1 through 22-V,U of 1/V is achieved by dividing the P styli into V groups of U styli. If $V = 4$, then the data is loaded in ¼ the time compared to the time required to load the data without grouping the styli. This reduction in loading time is obtained through a small increase in the complexity of the hardware (i.e., increase in the complexity of controller 20 and the additional lines 21-2 through 21-V).

This embodiment has two advantages:

1. It allows a faster effective data rate for a given clock speed, thereby making possible a faster printer, or 2. It allows a slower clock speed for the same effective data rate (this reduces the power consumed by the circuitry).

The data rate is the number of bits per line times the number of lines per second printed by the printer.

As in the previously described embodiment, each of styli 23-1 through 23-P is activated simultaneously, but the time necessary to load the styli control circuits 22-1,1 through 22-V,U associated with the styli 23-1 through 23-P is significantly reduced by the amount 1/V.

Figure 6A:
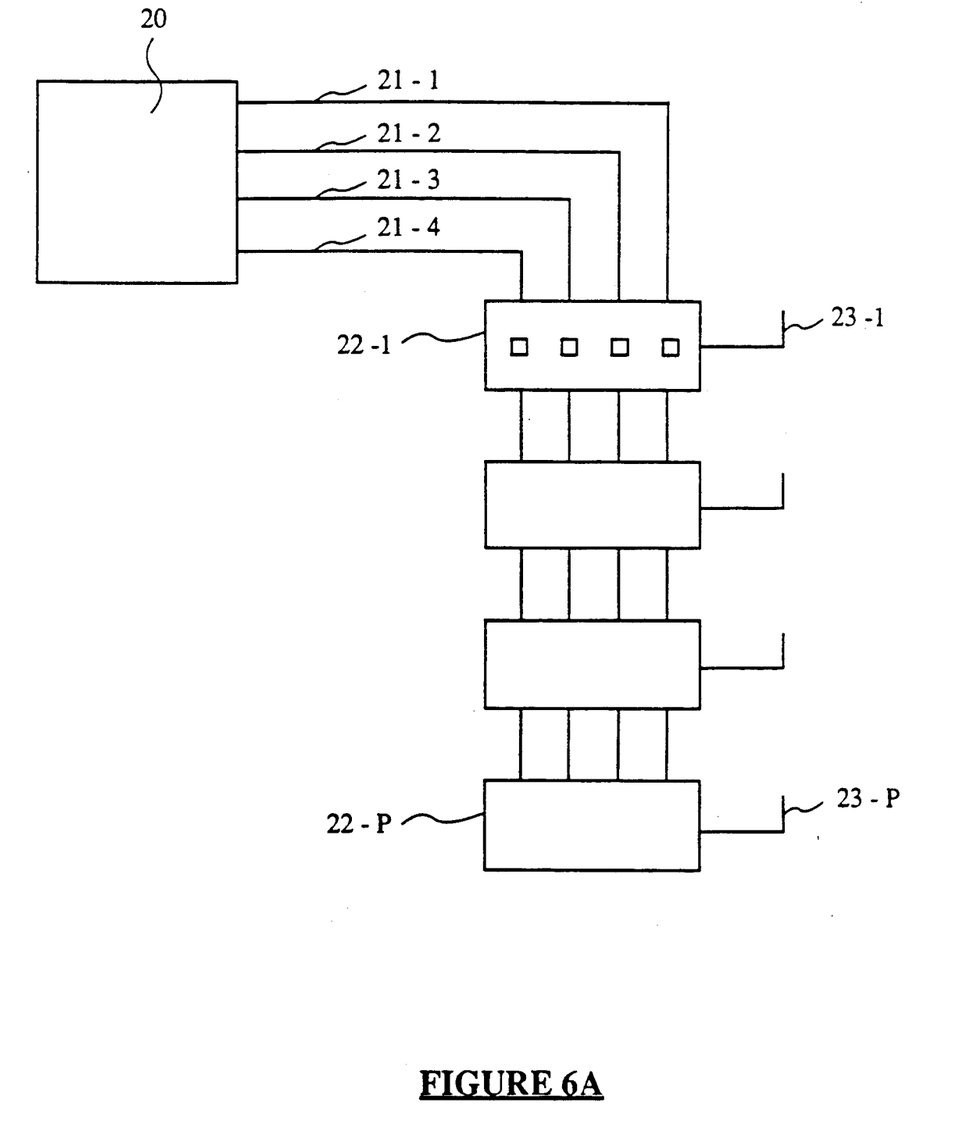
FIG. 6A illustrates in schematic block diagram form an embodiment of this invention wherein each of the styli 23-1 to 23-P is driven by a corresponding one of styli control circuits 22-1 to 22-P, each stylus control circuit being loaded in parallel with all the stylus control bits from controller 20 required to control the charge to be placed on the print medium adjacent the stylus controlled by that control circuit.
Figure 6B:
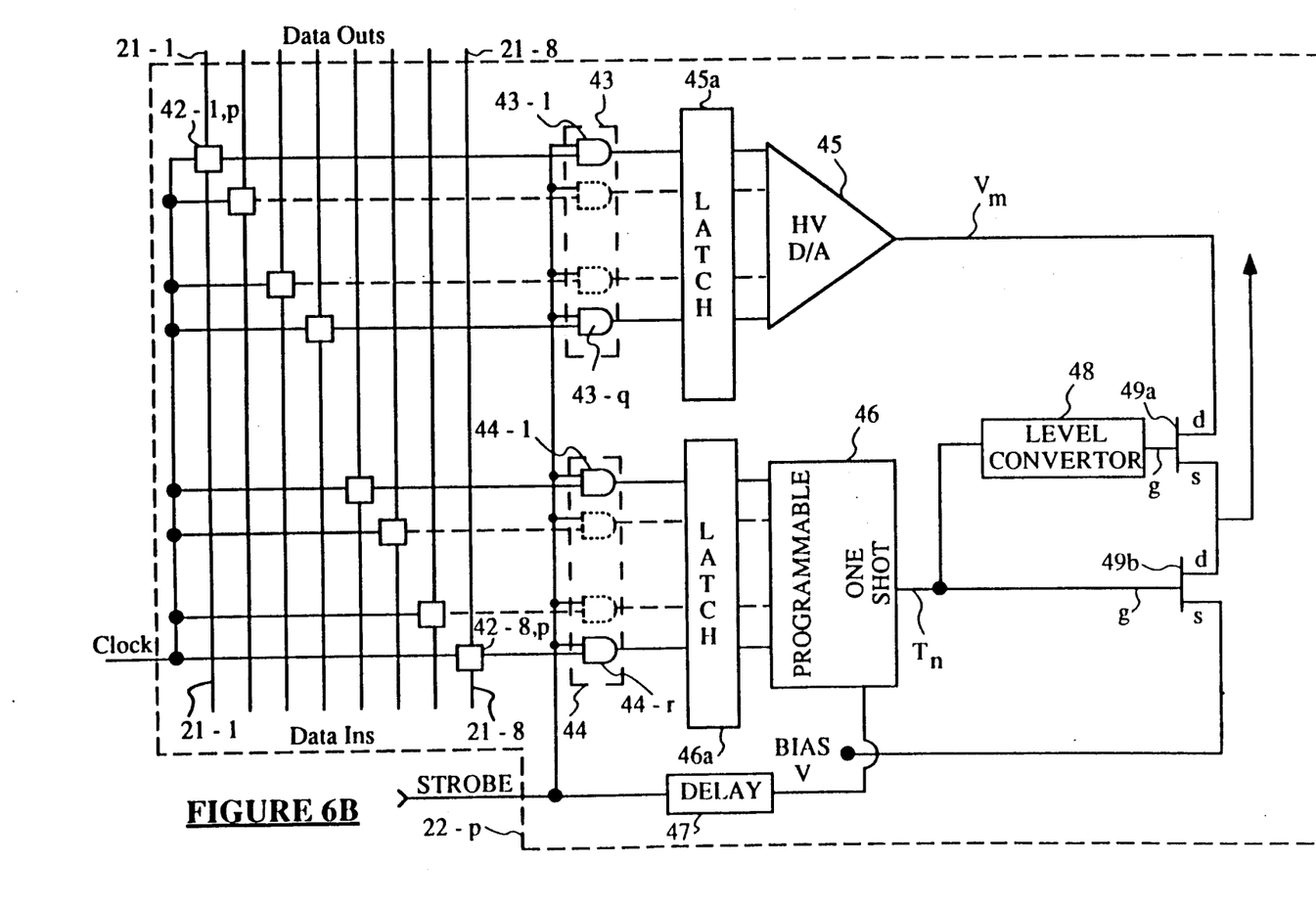
FIG. 6B illustrates in detail each of the styli driver circuits 22-1 through 22-P shown in FIG. 6A.

FIGS. 6A and 6B illustrate an alternative embodiment of this invention. FIG. 6A shows in schematic block diagram form an embodiment of this invention wherein each of the styli 23-1 through 23-P is driven by a corresponding one of styli control circuit 22-1 through 22-P. However, each of the styli control circuits 22-1 through 22-P is loaded in parallel with the styli control bits from controller 20. For illustrative purposes only, four leads 21-1 through 21-4 are shown to carry in-parallel four bits. Thus a total of 16 levels of gray scale can be achieved by the structure shown in FIG. 6A. It should be understood however that more than 4 bits can be used and indeed, in FIG. 6B illustrating the stylus control circuitry associated with a given stylus, 8 bits are illustrated as being used to control the gray scale for a total of 256 possible levels of gray. The number of different levels of gray discernible by the human eye is substantially less than 256.

FIG. 6B illustrates the structure of a given styli control circuit 22-p, where p is an integer given by $1 \leq p \leq P$. In this circuit, the input data (shown as consisting of eight bits rather than the four illustrated in FIG. 6A) is brought in parallel on leads 21-1 through 21-8 into bit storage registers 42-1,p through 42-8,p. Each of registers 42-1,p through 42-8,p stores one bit and is part of a P bit shift register with the other storage cells in each register corresponding on a one-to-one basis to the other styli in the set of styli 23-1 through 23-P. It takes P cycles to load all the shift registers with th data. However, because eight bits of data are loaded in parallel, the time necessary to load the eight shift registers is reduced to one-eighth the time taken when all the data is loaded serially as in the structure of FIG. 2. The remainder of the circuit shown in FIG. 6B works in the same manner as the circuit shown in FIG. 4A. Accordingly, the description of the operation of this portion of the circuit will not be repeated.

While this invention has been described in conjunction with two embodiments, other embodiments of this invention will be obvious to those skilled in the art in view of this disclosure.

What is claimed is:

1. An electrostatic printer including:
   a plurality of rectangular styli;
   means for moving a print medium past, but in sufficient proximity to, said styli to allow charge to be deposited on said print medium as a result applying voltages to each of said styli levels over a period of time; and
   means for controlling and varying both the voltage level applied to each stylus and the time said voltage level is applied to each stylus such that each stylus independently deposits an amount of charge on the print medium which is a function of both the voltage applied to said stylus and the time said voltage is applied to said stylus.

2. An electrostatic printer as in claim 1 wherein the voltage level is selected from a number of voltage levels between a voltage $V_1$ and a voltage $V_M$, where M is a selected integer and $V_1$ is greater than $V_M$ and the time of application of each of said voltage levels is varied from a time $T_1$ to a time $T_N$ where N is a second selected integer either equal or not equal to M and $T_N$ is greater than $T_1$.

3. An electrostatic printer as in claim 2 wherein M is 4.

4. An electrostatic printer as in claim 2 wherein N is 4.

5. An electrostatic printer as in claim 2 wherein M is 4 and N is 4.

6. An electrostatic printer including:
a plurality of styli;
means for moving a print medium past, but in sufficient proximity to, said styli to allow charge to be deposited on said print medium as a result of applying to each of said styli a voltage level over a period of time;
means for controlling and varying both the voltage level applied to each stylus and of the time said voltage level is applied to each stylus such that each stylus independently deposits an amount of charge on the print medium which is a function of both the voltage applied to said stylus and the time said voltage is applied to said stylus; and
a multiplicity of backplates adjacent both said styli and said print medium, wherein said plurality of styli are divided into D groups of K styli per group, and wherein a selected group of K styli is activated to deposit charge on said print medium by changing the voltage on the backplate corresponding to said selected group of K styli, where D and K are selected integers.

7. Structure as in claim 6 wherein each of said D backplates are activated in sequence simultaneously with selected ones of the K styli in a group of styli opposite a particular one of said backplates which is activated to deposit on said print medium charges from selected ones of the K styli in each of the D groups of styli.

8. Structure as in claim 7 wherein said print medium is held stationary during the deposition of the charge on said print medium from all D×K styli.

9. An electrostatic printer comprising
an electrostatic print head which includes a plurality of rectangular styli; and
means for varying both the voltage applied to each stylus and the time during which said voltage is applied to the stylus.

10. An electrostatic printer including:
a plurality of styli;
means for moving a print medium past, but in sufficient proximity to, said styli to allow charge to be deposited on said print medium as a result of applying a voltage level to each of said styli;
means for controlling the voltage level applied to each stylus such that each stylus independently deposits an amount of charge on the print medium which is a function of the voltage applied to said stylus; and
a multiplicity of backplates adjacent both said styli and said print medium, wherein said plurality of styli are divided into D groups of K styli per group, and wherein a selected group of K styli is activated to deposit charge on said print medium by changing the voltage on the backplate corresponding to said selected group of K styli.

11. Structure as in claim 10 wherein each of said D backplates are activated in sequence simultaneously with selected ones of the K styli in a group of styli opposite a particular one of said backplates which is activated to deposit on said print medium charges from selected ones of the K styli in each of the D groups of styli.

12. Structure as in claim 11 wherein said print medium is held stationary during the deposition of the charge on said print medium from all styli;

13. An electrostatic printer including:
a plurality of P styli, where P is a selected integer;
a corresponding plurality of P stylus control circuits, each stylus control circuit being connected to a corresponding one of said P styli for controlling the amount of charge deposited by said styli on a print medium; and
means for transferring data to each of said P styli control circuits, said means for transferring data including means for transferring up to n bits to each of said styli control circuits thereby allowing $2^n$ possible voltage levels to be applied to each of said P styli;
wherein said P styli are divided into V groups of U Styli each, where U and V are each selected integers and wherein said means for transferring said n control bits to each of said styli control circuits comprises
means for transferring in series control bits to the U styli control circuits controlling the U styli in each of the V sets of styli and for transferring in parallel the control bits to all of said V sets of styli control circuits.

14. An electrostatic printer including:
a plurality of P styli, where P is selected integer;
a corresponding plurality of P stylus control circuits, each stylus control circuit being connected to a corresponding one of said P styli for controlling an amount of charge deposited by said styli on a print medium; and
means for transferring data to each of said P styli control circuits, said means for transferring data including means for transferring up to n bits to each of said styli control circuits thereby allowing $2^n$ possible voltage levels to be applied to each of said P styli, where n is a selected integer;
wherein said means for transferring up to n bits to each of said styli control circuits comprise means for transferring up to n bits of data in parallel to each of the P styli control circuits, wherein P sets of n bits of data each are transferred serially to said styli control circuits.

15. An electrostatic printer as in claim 14, wherein each stylus has a rectangular cross-section and wherein said printer further comprises means for controlling and varying both a level and a time said voltage is applied to each stylus.

* * * * *